(No Model.) 2 Sheets—Sheet 2.

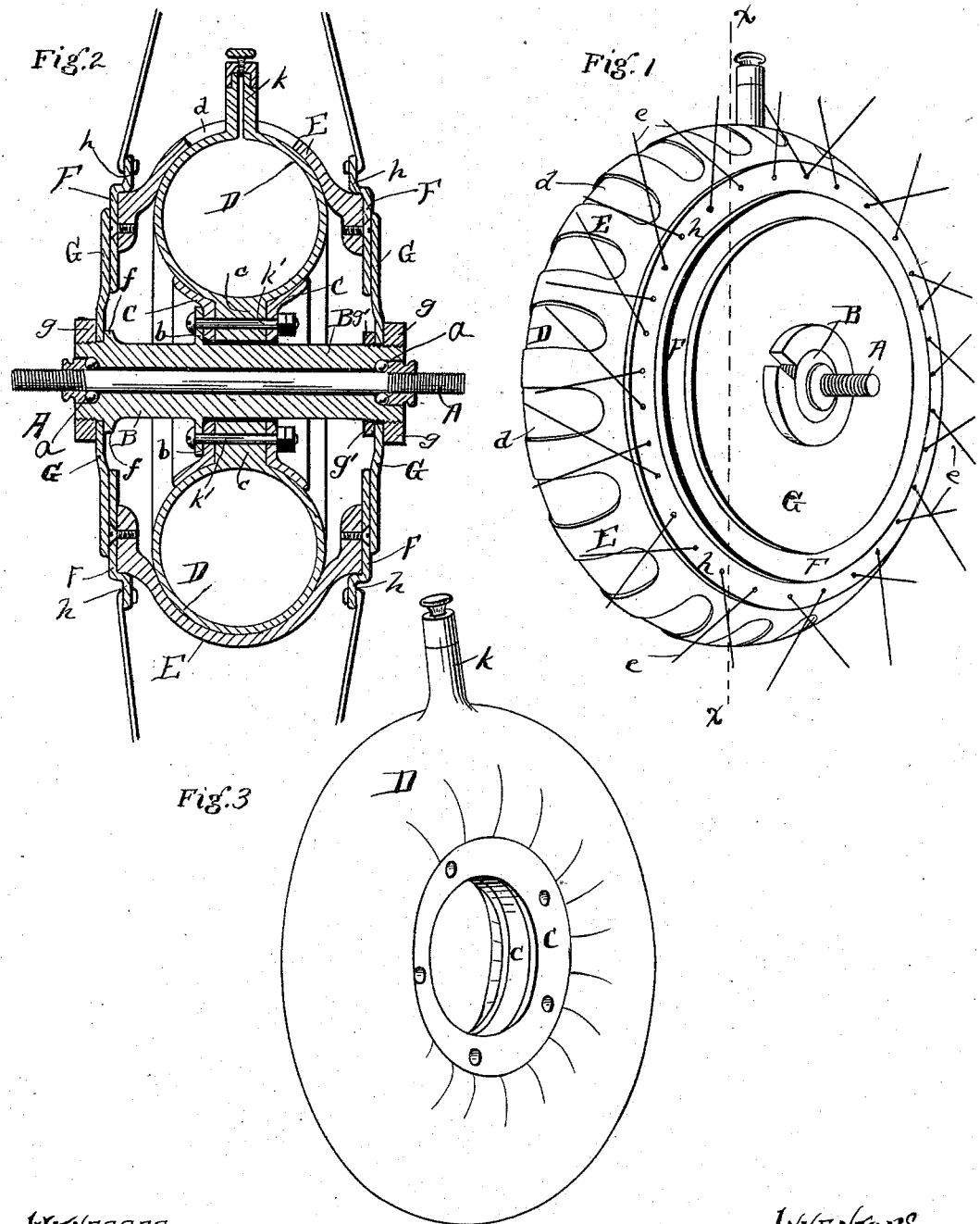

L. D. BALL & E. S. BARNES.
VEHICLE HUB.

No. 570,448. Patented Nov. 3, 1896.

WITNESSES.
C. J. Cross
J. T. Jeffers

INVENTORS
Lorenzo D. Ball
Ewing S. Barnes
By Fred W. Bond
Attorney.

UNITED STATES PATENT OFFICE.

LORENZO D. BALL AND EWING S. BARNES, OF CANTON, OHIO.

VEHICLE-HUB.

SPECIFICATION forming part of Letters Patent No. 570,448, dated November 3, 1896.

Application filed September 7, 1895. Serial No. 561,747. (No model.)

*To all whom it may concern:*

Be it known that we, LORENZO D. BALL and EWING S. BARNES, citizens of the United States, residing at Canton, in the county of Stark and State of Ohio, have invented certain new and useful Improvements in Vehicle-Hubs; and we do hereby declare that the following is a full, clear, and exact description of the same, reference being had to the annexed drawings, making a part of this specification, and to the letters of reference marked thereon, in which—

Figure 4:
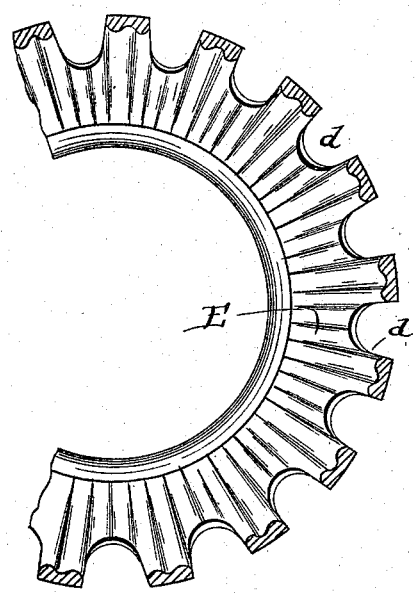
Figure 5:
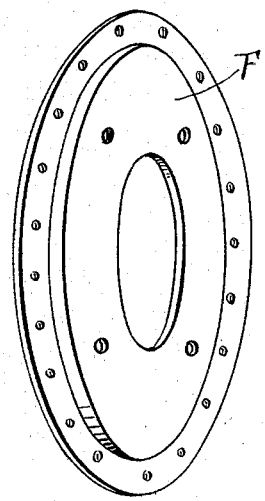
Figure 6:
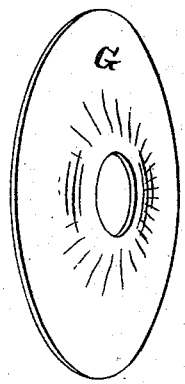
Figure 7:
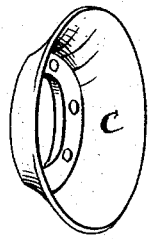

Figure 1 is a perspective view of the hub, showing all of its different parts properly connected. Fig. 2 is a section through line $x\ x$, Fig. 1. Fig. 3 is a detached view of the pneumatic ring. Fig. 4 is a view showing a portion of the outer hub-band. Fig. 5 is a detached view of the spoke, connecting-disk, or plate. Fig. 6 is a detached view of one of the outer disks. Fig. 7 is a detached view of one of the pneumatic rings, retaining-disks, or collars.

The present invention has relation to vehicle-hubs more especially designed for use in bicycle-wheels and light structures; and it consists in the different parts and combination of parts hereinafter described, and particularly pointed out in the claim.

Similar letters of reference indicate corresponding parts in all the figures of the drawings.

In the accompanying drawings, A represents the stationary or fixed shaft, which is constructed in the ordinary manner. Upon the shaft A is mounted the hollow hub B, which is preferably provided with ball-bearings, such as $a$. Upon the hub B are mounted the pneumatic ring or tube retaining collars C, which collars are located substantially as illustrated in Fig. 2, and for the purpose of causing the collars C to rotate with the hub B the flange $b$ is provided. Said flange is also for the purpose of holding the collars C in proper position upon the hub B and at the same time preventing the collars C from moving or slipping upon the hub.

The pneumatic ring D is substantially of the form shown in Fig. 3, and is preferably formed of rubber or like material. The ring or tube D is provided with the radial flange $c$, which flange is preferably formed integral with the ring D, and of sufficient strength to carry out the objects hereinafter described.

The collars C are formed concave upon their peripheries, as illustrated in Figs. 2 and 7, and are so formed for the purpose of providing a groove for the reception of the inner periphery of the ring D.

The outer band or ring E is substantially of the form shown in Figs. 1 and 2, and, as illustrated, it is convexo-concave in cross-section, and is so formed for the purpose of receiving and embracing the outer periphery of the ring or tube D. For the purpose of reducing the weight of the ring or band E and at the same time assisting in preventing the ring or tube D from slipping said ring or band E is provided with the cut-out portions $d$. Another object and purpose of providing the cut-out portions $d$ is to allow the tube D to extend into the cut-out portions, thereby compensating for any vertical movement of the shaft A independent of the wheel proper. For the purpose of assisting in holding the ring or tube D in close contact with the band or ring E the inner periphery of said band is corrugated or grooved, as illustrated in Fig. 4, thereby assisting in causing the band or ring E to rotate with the ring or tube D. To the said faces of the band or ring E are attached the plates F, said plates being located and arranged substantially as shown in Figs. 1 and 2, and to which plates are attached the wheel-spokes $e$. For the purpose of holding the band or ring E in proper position the disks G are provided, which disks are located upon the hub B, and are formed of such a diameter that they will embrace or overlap a portion of the plates F. The disks G are held in proper position upon the hub B by means of the shoulder $f$ and the nuts $g$ and $g'$, said parts being located substantially as shown in Fig. 2. For the purpose of preventing the disks G from striking or coming in contact with the inner ends of the spokes $e$ the plates F are provided with the flanges $h$, which flanges are extended or set a short distance inward, as illustrated in Figs. 1 and 2.

For the purpose of properly inflating the ring or tube D said ring or tube is provided upon its outer periphery with the nipple k, which is constructed in the ordinary manner and is to be provided with the ordinary valves.

In use the different parts belonging to the hub proper are placed in the position illustrated in Figs. 1 and 2, after which the ring or tube D is properly inflated, thereby holding the band or ring E in its proper relative position. It will be understood that by our peculiar arrangement we are enabled to provide a hub that will have the desired amount of elasticity, thereby saving the necessity of placing a pneumatic tire upon the outer periphery of the wheel. By providing the ring or tube D with the radial flange c we are enabled to securely clamp and hold the tube D in proper position by means of the clamping-bolts k', which clamping-bolts are passed through the radial flange c and the collars C, as illustrated in Fig. 1.

In the drawings we have omitted the sprocket-wheel, but it will be understood that the hub B may be extended a sufficient distance to properly attach a sprocket-wheel.

Having fully described our invention, what we claim as new, and desire to secure by Letters Patent, is—

The combination of the shaft A, having mounted thereon the hollow hub B, provided with the integral flange b, the collars C formed concaved upon their peripheries, the tube D provided with the radial flange c, the clamping-bolts k' passed through the collars C and the flange c and secured to the flange b, the outer band or ring E located upon the outer periphery of the tube D, and the plates or disks G located upon the hub B, and the plates F provided with the shoulders h, substantially as and for the purpose set forth.

In testimony that we claim the above we have hereunto subscribed our names in the presence of two witnesses.

LORENZO D. BALL.
EWING S. BARNES.

Witnesses:
F. W. BOND,
J. W. STEINER.